United States Patent
Theodoras, II (10) Patent No.: US 7,729,416 B2
(45) Date of Patent: Jun. 1, 2010

(54) 1000BASE-T TRANSMISSION OVER 2-PAIR

(75) Inventor: James T. Theodoras, II, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 981 days.

(21) Appl. No.: 11/383,348

(22) Filed: May 15, 2006

(65) Prior Publication Data

US 2007/0263707 A1    Nov. 15, 2007

(51) Int. Cl.
   *H04B 1/38*   (2006.01)
(52) U.S. Cl. ............ 375/220; 375/353; 370/420; 370/421; 370/423
(58) Field of Classification Search .......... 375/220, 375/353, 265, 288; 370/421, 420, 359, 423; 341/144, 173; 332/120, 149, 151; 329/348, 329/349, 353
   See application file for complete search history.

(56) References Cited

U.S. PATENT DOCUMENTS

| | | | |
|---|---|---|---|
| 6,088,827 A | | 7/2000 | Rao |
| 6,377,640 B2 * | | 4/2002 | Trans .................. 375/354 |
| 6,473,608 B1 | | 10/2002 | Lehr et al. |
| 7,548,549 B2 * | | 6/2009 | Bergeron et al. ........... 370/419 |
| 2003/0115541 A1 * | | 6/2003 | Azadet et al. ............... 714/796 |
| 2004/0164619 A1 * | | 8/2004 | Parker et al. ................ 307/80 |
| 2006/0153307 A1 * | | 7/2006 | Brown et al. ................ 375/257 |
| 2007/0248024 A1 * | | 10/2007 | Conway et al. ............. 370/252 |

OTHER PUBLICATIONS

PCT International Search Report dated Nov. 15, 2007.

* cited by examiner

*Primary Examiner*—David C Payne
*Assistant Examiner*—Rahel Guarino
(74) *Attorney, Agent, or Firm*—Patterson & Sheridan, LLP (57) ABSTRACT

A method, an apparatus and a system for gigabit Ethernet (GbE) using only 2 pairs of wires for a single communications link are described. This network communication may be referred to as 2-pair 1000Base-T. GbE using only 2 wire pairs per link may offer increased port density over a conventional 1000Base-T link. As an alternative, 2-pair 1000Base-T may also provide increased link bandwidth over the existing 1000Base-T standard. When a given number of conventional links in a system are replaced by the same number of 2-pair 1000Base-T links, the system bandwidth may also be consequently increased. Transformers and power supplies may be combined with GbE utilizing only two wire pairs to provide power over Ethernet (PoE) solutions.

20 Claims, 7 Drawing Sheets

4-pair category 5 UTP full-duplex link

H = Hybrid canceller transceiver
T = Transmit encoder
R = Receive decoder

1000BASE-T TRANSMISSION OVER 2-PAIR

BACKGROUND OF THE INVENTION

1. Field of the Invention

Embodiments of the present invention generally relate to high speed network interfaces, and more particularly to gigabit Ethernet using the 1000Base-T standard.

2. Description of the Related Art

One of the more recent developments in high speed networking has been gigabit Ethernet (GbE) as defined in the IEEE 802.3ab standard, also known as 1000Base-T. Able to provide 1 gigabit per second (Gbps) bandwidth in addition to the simplicity of an Ethernet connection, GbE offers a smooth, seamless upgrade path for current 10Base-T or 100Base-T Ethernet installations running at 10 megabits per second (Mbps) and 100 Mbps, respectively.

In order to obtain the requisite gigabit performance levels, GbE transceivers are interconnected using four separate pairs of twisted Category 5 (Cat 5) copper wires for a single link. In reality, gigabit Ethernet requires Category 5 Enhanced (Cat 5e) cables, but since virtually all cables sold as Cat 5 meet the Cat 5e standard, this specification will simply refer to Cat 5 cable from now on. Getting back to the four twisted wire pairs, gigabit communication, in practice, involves the simultaneous, parallel transmission of these four information signals, with each signal conveying information at a bit rate of 250 Mbps, followed by their simultaneous, parallel reception and concatenation. The present 1000Base-T standard also requires that the digital information being processed for transmission be symbolically represented in accordance with a five-level pulse amplitude modulation scheme (PAM5) and encoded with an 8-state Trellis coding methodology. The 2-bit PAM5 scheme actually limits the transmission across the Cat 5 cable to 125 Mbaud, using approximately 80 MHz of the cable bandwidth.

Despite the increased bandwidth of gigabit Ethernet, the need for four twisted pair wires for a single 1000Base-T link causes problems, especially when compared to only two pairs of twisted wires needed for the previous 10Base-T and 100Base-T standards. Furthermore, network switching integrated circuits (ICs) have grown in capacity faster than physical link elements (e.g. network cables and connectors), and thus, the switching capacity of linecards has outpaced faceplate densities. Because of this, the data switch on the linecard will be undersubscribed, and the unused bandwidth of the network IC will be wasted whenever the faceplate jacks on such a limited density linecard run out.

Accordingly, what is needed is a gigabit Ethernet system that achieves greater connection density, preferably while still working within the boundaries of existing GbE standards and cabling, while maintaining backwards compatibility.

BRIEF DESCRIPTION OF THE DRAWINGS

A more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide a gigabit Ethernet (GbE) system using only 2 pairs of wires for a single link. Such embodiments may offer increased link bandwidth over a conventional 1000Base-T link, and when a given number of conventional links in a system are replaced by the same number of links according to embodiments of the invention, the system bandwidth may also be consequently increased. As an alternative, such embodiments may also provide increased port density over the existing 1000Base-T standard.

Before delving into embodiments of the present invention, an examination of a typical implementation of the current 1000Base-T standard is provided for context.

Figure 1:
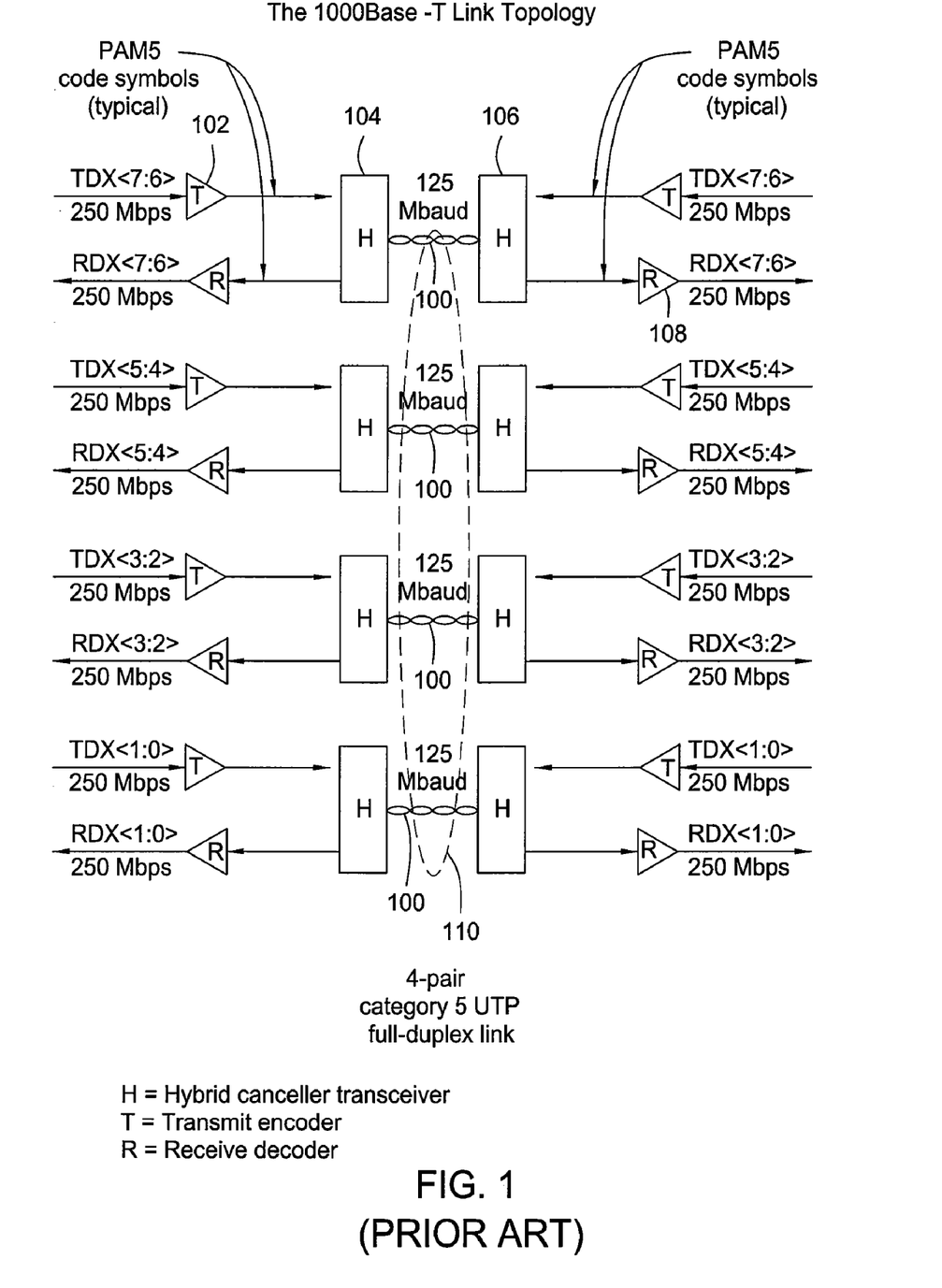
FIG. 1 is a schematic/block diagram of a prior art 1000Base-T link topology using all four pairs of twisted wires provided in a single Category 5 (Cat 5) cable.

FIG. 1 is a schematic/block diagram of a prior art 1000Base-T link topology using four pairs of twisted wires 100 in a single Category 5 (Cat 5) cable.

Considering signal transmission in one direction only for the purposes of discussion, each of the transmit encoders 102 transmits digital data at 250 Mbps and encodes it with the standard PAM5 scheme. The encoded signals are sent to a first set of hybrid canceller transceivers 104 for transmission at a rate of 125 Mbaud across the twisted wire pairs 100 of the Cat 5 cable where a second set of hybrid canceller transceivers 106 receives the signals. The encoded signals are sent to the receive decoders 108 for decoding back to digital data where further transmission occurs at 250 Mbps. Plastic insulation 110 surrounds the four twisted wire pairs 100, and together these two elements compose the physical Cat 5 cable.

As shown, this topology depicting only a single 1000Base-T link may be connected to a registered jack 45 (RJ-45) connector (not shown) allowing for just these four twisted wire pairs 100, but the topology can also be replicated so that six links may be connected to an mRJ21 connector, which allows for 24 twisted wire pairs. These connectors would appear between the twisted wire pairs 100 and the sets of hybrid canceller transceivers 104, 106 in FIG. 1.

An Exemplary Two-Pair Gigabit Ethernet

Figure 2:
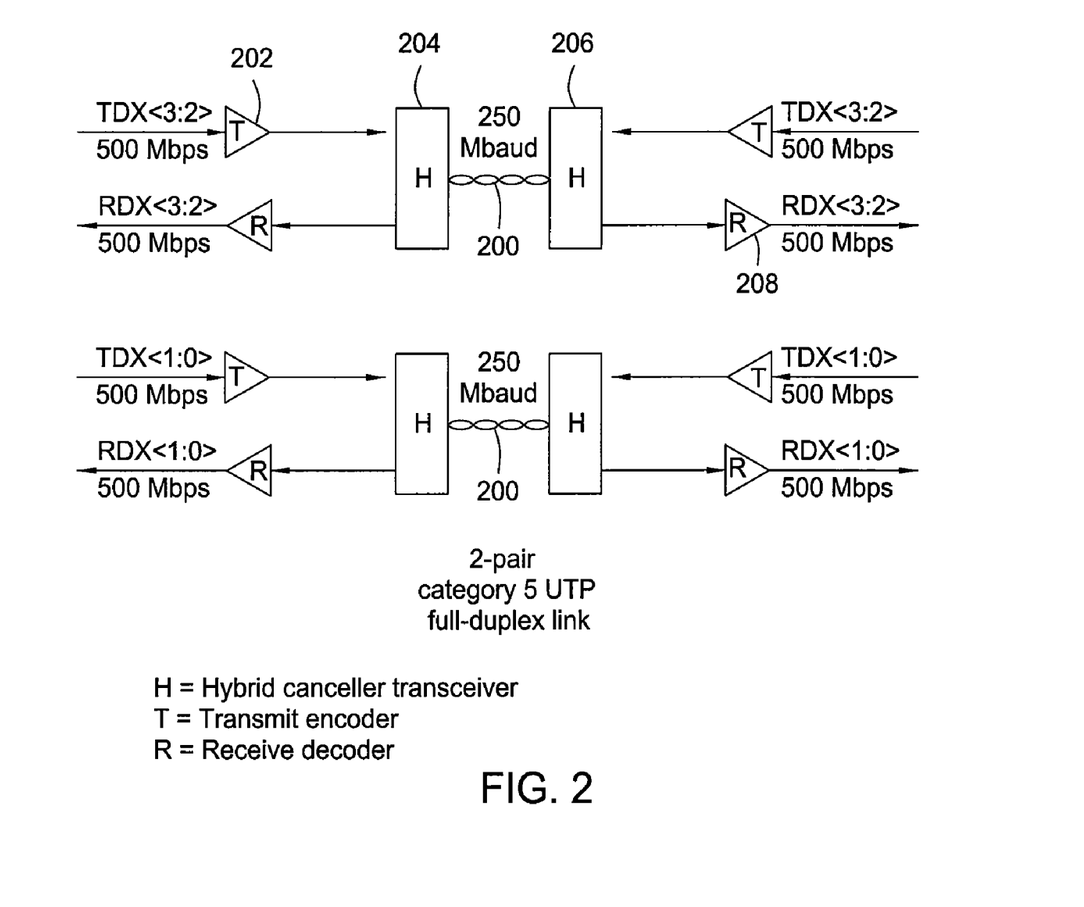
FIG. 2 is a schematic/block diagram of a 1000Base-T link topology requiring only two pairs of twisted wires for transmission in Cat 5 cable according to one embodiment of the invention.

FIG. 2 is a schematic/block diagram of a 1000Base-T link topology requiring only two pairs of twisted wires 200 for transmission in Cat 5 cable according to one embodiment of the invention. This scheme may be referred to as 2-pair 1000Base-T. Again, even though signals are transmitted in both directions, this description will consider signal transmission in a single direction for clarity.

Instead of transmitting at 250 Mbps with four transmit encoders for a single link as in the prior art of FIG. 1, only two transmit encoders 202 may transmit digital data at 500 Mbps and encode it with the standard PAM5 scheme. The encoded signals may be sent to a first set of hybrid canceller transceivers 204 for transmission at a rate of 250 Mbaud across the twisted pairs 200 of the Cat 5 cable where a second set of hybrid canceller transceivers 206 may receive the signals. The encoded signals may be sent to two receive decoders 208 for decoding back to digital data where further transmission occurs at 500 Mbps.

As previously mentioned, conventional 1000Base-T transmission across the cable at 125 Mbaud only uses approximately 80 MHz of the cable bandwidth. However, Cat 5 cable actually possesses an available bandwidth of 150-250 MHz. Thus, the data throughput for some embodiments of the present invention may be doubled by doubling the cable transmission bit rate and continuing to use the existing PAM5 encoding. Effectively, such embodiments of 2-pair 1000Base-T may have a communication rate of 2 Gbps. They may even achieve a maximum total data transfer rate of 4 Gbps when operating with full-duplex. For some other embodiments, the data throughput may be doubled by moving to a higher order pulse amplitude modulation (PAM) encoding in an effort to effectively double the symbol rate. For instance, 10GBase-T uses PAM10 encoding with cable transmission rates of 833 Mbaud, requiring 450 MHz of cable bandwidth.

Figure 3:
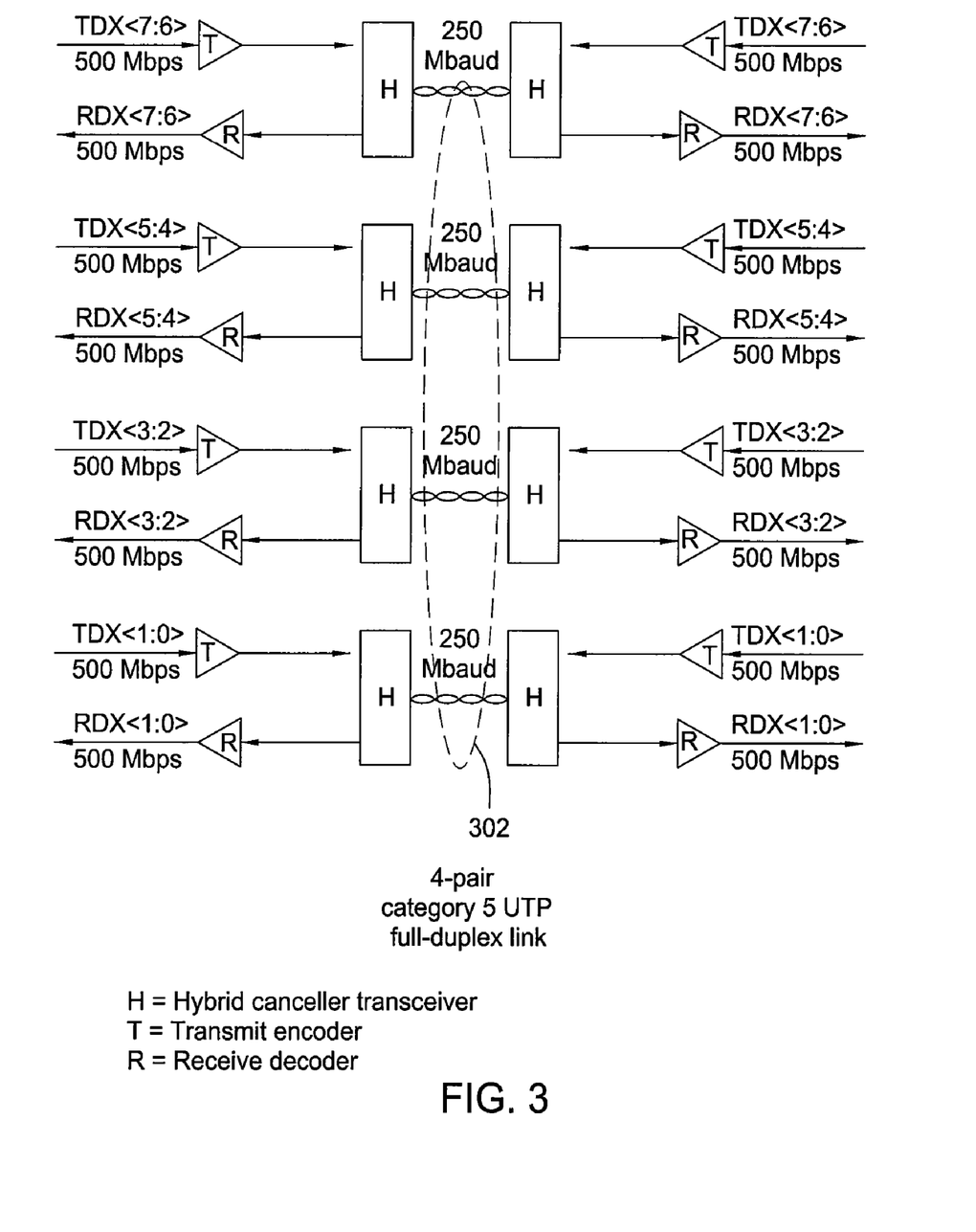
FIG. 3 is a schematic/block diagram of two 1000Base-T links, each single link requiring only two pairs of twisted wires for transmission in Cat 5 cable according to one embodiment of the invention.

While this topology depicting only a single 2-pair 1000Base-T link may be connected to an RJ-45 connector (not shown) by itself, some embodiments of the invention allow for a second 1000Base-T link to be carried by the same RJ-45 connector and Cat 5 cable 302 as shown in FIG. 3. In other words, the standard 4-pair Cat 5 unshielded twisted pair (UTP) cable 302 with an RJ-45 connector may now carry two 1000Base-T links. The combination of these two 2-pair 1000Base-T links may operate with the same bandwidth as a single conventional 1000Base-T link. Moreover, embodiments of the present invention can also be replicated so that 12 1000Base-T links may be connected to an mRJ21 connector instead of the conventional six links. In either case, embodiments of the invention may allow for doubled port density over the IEEE 802.3ab standard for gigabit Ethernet.

Figure 4:
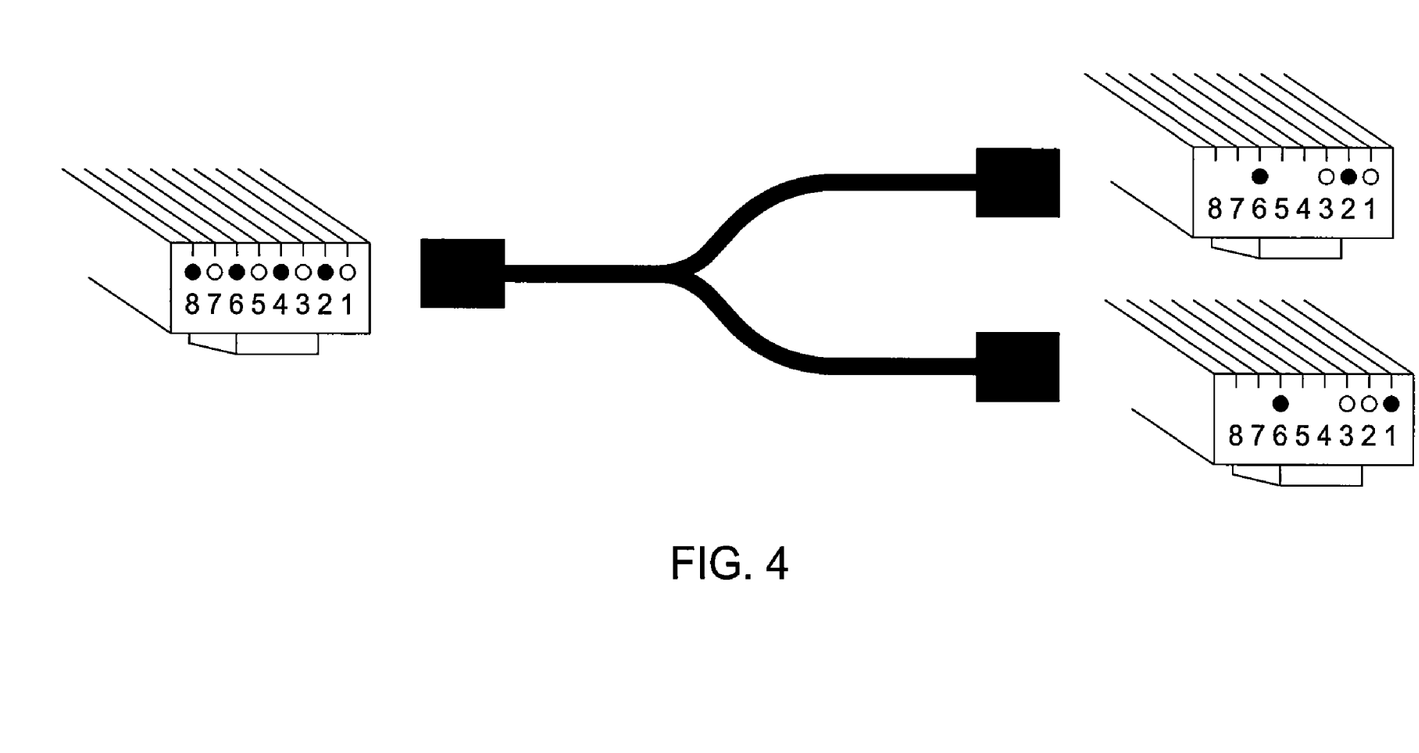
FIG. 4 is a representation of an RJ-45 1:2 breakout cable for use with embodiments of the invention.

To implement the increased port density, 1:2 breakout cables may be required at one end of the high speed network as depicted in FIG. 4. For instance, the increased port density achieved by some embodiments of the invention may be utilized at the switching linecard where two 1000Base-T links can now fit in the space that used to be required for a single 1000Base-T link, but then breakout cables may be required to go to separate devices at the end of the link opposite the switching linecard connection. A 1:2 breakout cable may not be required, and a standard cable may then be used, if both ends of the cable each need only connect to a single location.

At the data link layer, two links of inbound 2-pair 1000Base-T may be treated as two separate GbE signals and may be given two separate Media Access Control (MAC) addresses. Since state-of-the-art network ICs can typically process 8 to 16 GbE signals anyway, no additional burden may be placed upon the network IC.

Figure 5:
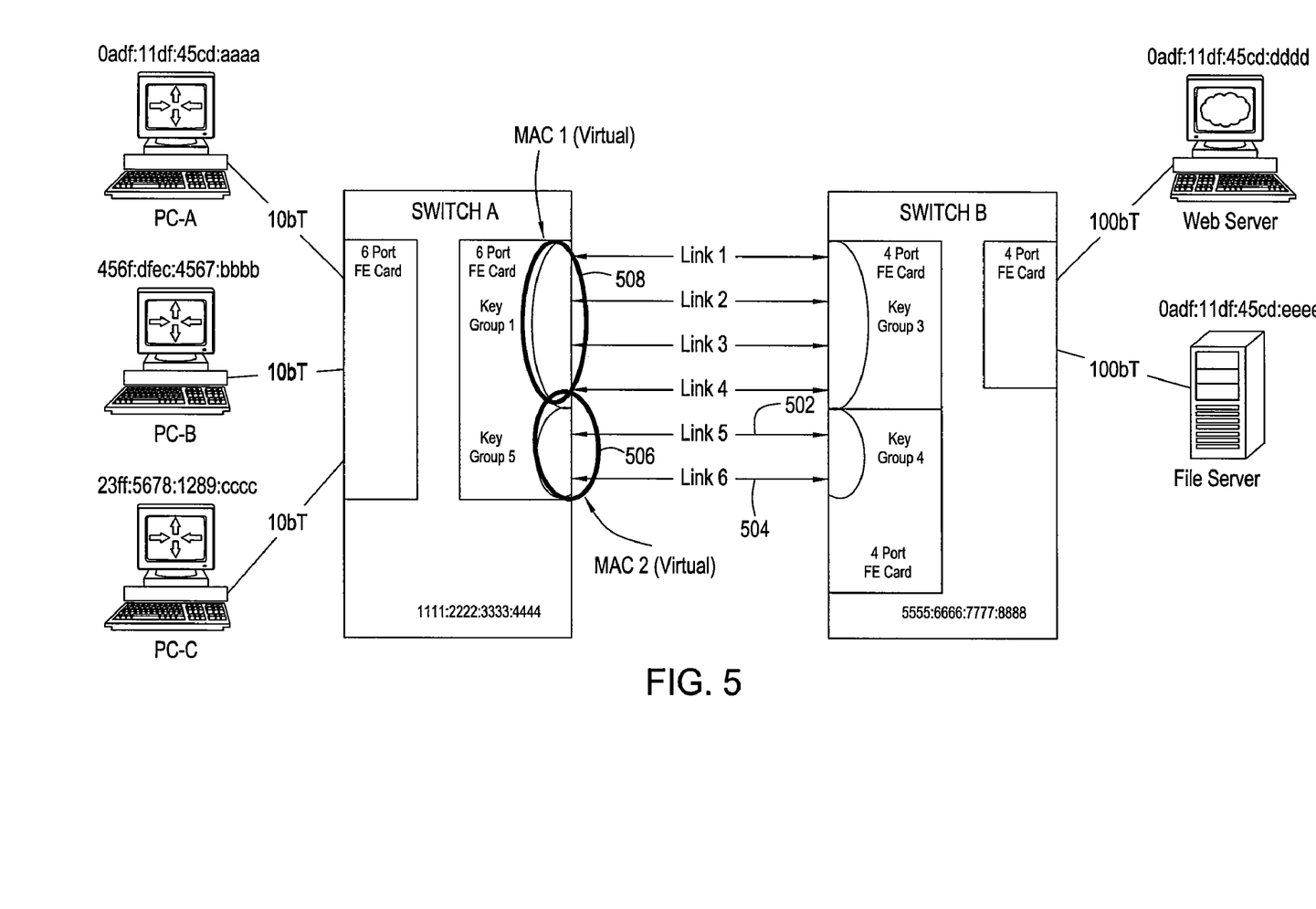
FIG. 5 is a block diagram of link aggregation using a virtual media access control (MAC) address according to embodiments of the invention.

For some embodiments, these two links of the 2-pair 1000Base-T solution may be considered as a single link with a virtual MAC address. FIG. 5 illustrates this link aggregation. With embodiments of the invention, two 1000Base-T links may be carried on the same RJ-45 connector and 4-pair UTP Cat 5 cable. For instance, Link 5 502 and Link 6 504 can travel within the same 4-pair UTP Cat 5 cable (not shown) according to embodiments of the invention. Link 5 502 may be given a particular MAC address, while Link 6 504 may be given a different MAC address. For some embodiments, Link 5 502 and Link 6 504 may be aggregated to share the same virtual MAC address, MAC 2 506 in the figure. Even more than two links may be provided with a single virtual MAC address. MAC 1 508 depicts four links being aggregated together.

Even if increased port density is not required, replacing existing 1000Base-T interfaces with interfaces implementing embodiments of the invention may increase the bandwidth of the network. Since the cable transmission rate or the symbol rate may have been doubled in the 2-pair 1000Base-T scheme according to the invention, data from two pairs of wires can be read at twice the speed of the conventional four pairs. If the total number of system links is kept the same, but the links are replaced with interfaces using the 2-pair 1000Base-T scheme, then the bandwidth may double. If only a fraction of the system links are substituted for embodiments of the invention, then the bandwidth may still increase, but it will be multiplied by a factor lying between 1 and 2.

Auto-Negotiation

With network communications, different devices (e.g. switches, hubs and linecards) may be capable of transmitting information at different link speeds. Auto-negotiation is a process of sensing the transmission speed of two different devices and selecting the maximum speed that can accommodate both devices. To maintain backwards compatibility with legacy 1000Base-T links, the current 9-level Ethernet auto-negotiation methods may be extended to detect whether an endpoint connected to a network interface card (NIC) is 2-pair 1000Base-T compatible. Occurring at the physical layer of the Open Systems Interconnection Reference Model (OSI Model), auto-negotiation involves trying to communicate at the highest selection level, and when that communication fails, moving down to the next selection level until a compatible selection level is negotiated. Hence, auto-negotiation for 2-pair 1000Base-T may be accomplished by over-clocking the conventional 1000Base-T full duplex, which occupies selection level 9. This over-clocked scheme may be given a new selection level 10 in an auto-negotiation table. If this communication works, then a 2-pair 1000Base-T connection according to embodiments of the invention is present. If the over-clocked communication fails, then the parameters for the next lowest selection level may be attempted. This process may be repeated using the parameters for auto-negotiation at the attempted selection level until a compatible selection level is negotiated. The proposed selection level 10 for 2-pair 1000Base-T is shown in Table 1 below.

TABLE 1

The Defined Autonegotiation Selection Levels for UTP NICs

| Selection Level | Operational Mode | Maximum Total Data Transfer Rate (Mbps)[f] |
| --- | --- | --- |
| 10 | Dual 1000Base-T full-duplex | 4000 |
| 9 | 1000Base-T full-duplex | 2000 |
| 8 | 1000Base-T half-duplex | 1000 |

TABLE 1-continued

The Defined Autonegotiation Selection Levels for UTP NICs

| Selection Level | Operational Mode | Maximum Total Data Transfer Rate (Mbps) |
|---|---|---|
| 7 | 100Base-T2 full-duplex | 200 |
| 6 | 100Base-TX full-duplex | 200 |
| 5 | 100Base-T2 half-duplex | 100 |
| 4 | 100Base-T4 half-duplex | 100 |
| 3 | 100Base-TX half-duplex | 100 |
| 2 | 10Base-T full-duplex | 20 |
| 1 | 10Base-T half-duplex | 10 |

Power Over Ethernet

Figure 6:
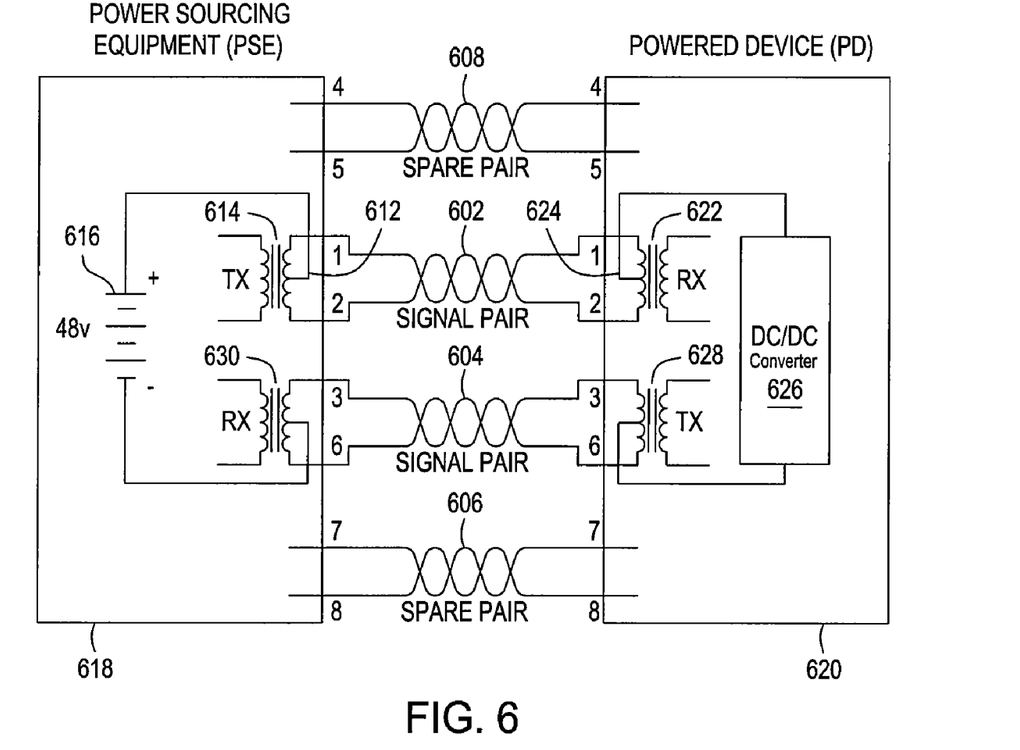
FIG. 6 is a schematic/block diagram of a 1000Base-T link topology for power over Ethernet requiring only two pairs of twisted wires for transmission in Cat 5 cable according to one embodiment of the invention.

Furthermore, embodiments of this invention may be incorporated into power over Ethernet (PoE) applications as illustrated in FIG. 6. Only two twisted wire pairs 602, 604 may be necessary to transmit both GbE signals and DC power according to embodiments of the invention. FIG. 6 shows all four twisted pairs in standard Cat 5 UTP cable, but two of the twisted pairs 606, 608 marked as spares may not be required. The center tap 612 of a center-tapped transmission transformer 614 may be connected to one terminal of a DC voltage supply 616 of Ethernet power source equipment 618. The signals may be transmitted across the twisted wire pair 602 while riding on top of a common-mode DC voltage from the supply 616. For some embodiments, this, this DC voltage may be 48 V. The GbE signals may be received by an Ethernet powered device 620 where the twisted pair 602 may be connected to a center-tapped reception transformer 622. The center tap 624 may be wired to a DC/DC converter 626 which may convert the common-mode DC voltage to another voltage level. This new voltage level may be used to power the Ethernet powered device 620. The DC return path may be provided by a second set of center-tapped transformers 628, 630 connected to one of the twisted wire pairs 604.

Figure 7:
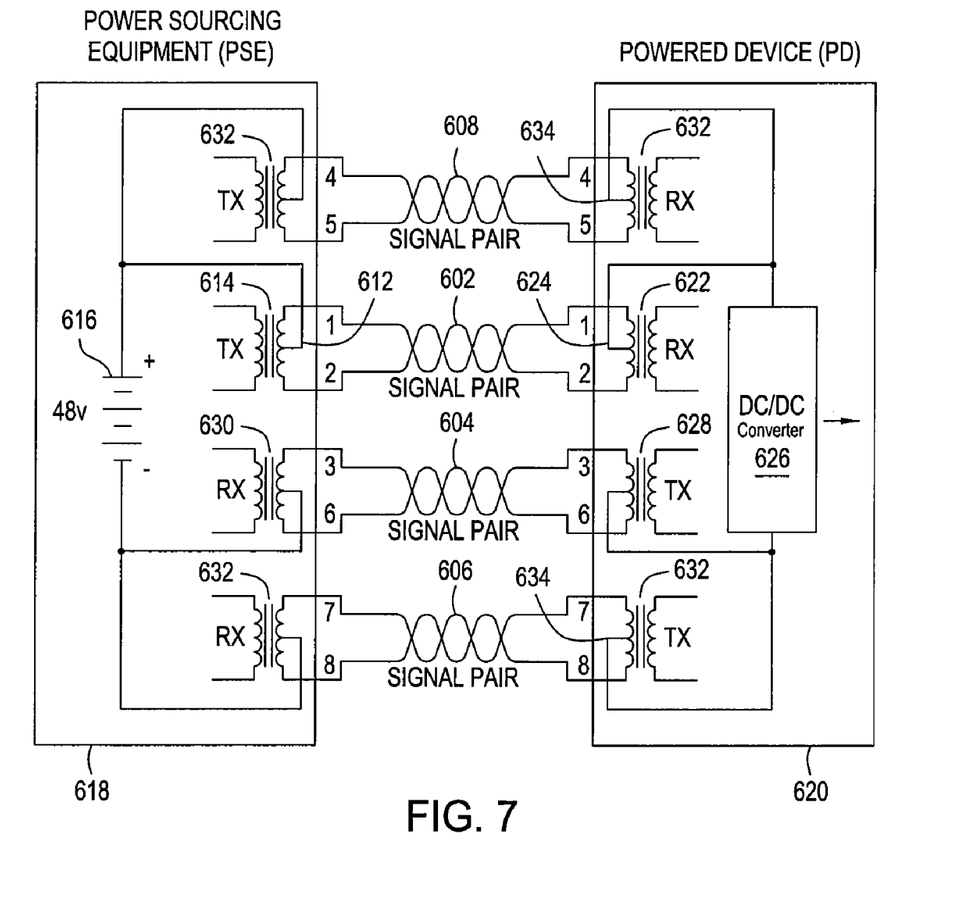
FIG. 7 is a schematic/block diagram of two 2-pair 1000Base-T links for power over Ethernet requiring only two pairs of twisted wires per link according to one embodiment of the invention.

Since the 2-pair 1000Base-T topology only requires two twisted wire pairs, the other two twisted wire pairs within a standard Cat 5 4-pair UTP cable may be employed, as well. For some embodiments, the spare twisted pairs 606, 608 may be used for a second link of 2-pair 1000 Base-T within the same standard Cat 5 UTP cable. For other embodiments, the power over Ethernet scheme presented above may be replicated to include four more center-tapped transformers 632 connected to the spare twisted pairs 606, 608 in an effort to create a second 2-pair 1000Base-T PoE link as illustrated in FIG. 7. Such embodiments may have the center taps 634 of the second link transformers 632 connected to the same DC/DC converter 626 within the Ethernet powered device 620, and the PoE standard as far as current delivery is concerned should not have to change. For some embodiments, a 1:2 breakout cable may be used to power a different Ethernet powered device (not shown) from the second link, although the DC current may be divided between the two links. Other such embodiments that employ the second 2-pair 1000Base-T PoE link may have the center taps 634 of the second link transformers 632 connected to a different DC/DC converter (not shown) within the Ethernet powered device 620 to create a separate supply voltage.

Within the current GbE structure, embodiments of the invention may only require changes to the ICs and software within switching and routing products at the physical layer. Among other things, these changes may include doubling the transmission bit rate or doubling the symbol rate by moving to a higher order PAM encoding. No changes to cables, connectors, MAC addresses or network processors should be required. The 2-pair 1000Base-T scheme also works within the boundaries of existing standards, so there should also not be a need to define a new standard.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
 a connector for providing a network connection via cabling utilizing wire pairs; and
 an interface device coupled to the connector, the interface device comprising:
  two transmit encoders, the two transmit encoders transmitting data and encoding the data with a pulse amplitude modulation (PAM);
  a first set of two hybrid canceller transceivers, the first set of two hybrid canceller transceivers receiving the encoded data from the two transmit encoders and transmitting the data as a signal across two of the wire pairs;
  a second set of two hybrid canceller transceivers, the second set of two hybrid canceller transceivers receiving the signal from the first set of two hybrid canceller transceivers; and
  two receive decoders, the two receive decoders receiving the signal from the second set of two hybrid canceller transceivers and decoding the signal back to data for further transmission; wherein
  the interface device is configured to establish at least a first communications link capable of transmitting data at a throughput of at least 1 gigabit per second (Gbps) using just the two of the wire pairs.

2. The apparatus of claim 1, wherein the connector comprises a registered jack 45 (RJ-45) connector.

3. The apparatus of claim 1, wherein the cabling comprises Category 5 Enhanced (Cat 5e) cabling.

4. The apparatus of claim 1, wherein the PAM has more than five levels.

5. The apparatus of claim 1, wherein the PAM has five levels or less.

6. An apparatus, comprising:
 a connector for providing a network connection via cabling utilizing at least four wire pairs; and
 an interface device coupled to the connector, the interface device comprising:
  two transmit encoders, the two transmit encoders transmitting data and encoding the data with a pulse amplitude modulation (PAM);
  a first set of two hybrid canceller transceivers, the first set of two hybrid canceller transceivers receiving the encoded data from the two transmit encoders and transmitting the data as a signal across two of the wire pairs;

a second set of two hybrid canceller transceivers, the second set of two hybrid canceller transceivers receiving the signal from the first set of two hybrid canceller transceivers; and two receive decoders, the two receive decoders receiving the signal from the second set of two hybrid canceller transceivers and decoding the signal back to data for further transmission; wherein the interface device is configured to establish at least two communications links, each link capable of transmitting data at a throughput of at least 1 gigabit per second (Gbps) using just the two of the wire pairs.

7. The apparatus of claim 6, wherein the interface device is configured to aggregate at least two links with a single virtual media access control (MAC) address.

8. An apparatus, comprising:

a connector for providing a network connection via cabling utilizing at least four wire pairs;

an interface device, the interface device comprising:

four transmit encoders, the four transmit encoders transmitting data and encoding the data with a pulse amplitude modulation (PAM);

a first set of four hybrid canceller transceivers, the first set of four hybrid canceller transceivers receiving the encoded data from the four transmit encoders and transmitting the data as a signal across the four wire pairs;

a second set of four hybrid canceller transceivers, the second set of four hybrid canceller transceivers receiving the signal from the first set of four hybrid canceller transceivers; and four receive decoders, the four receive decoders receiving the signal from the second set of four hybrid canceller transceivers and decoding the signal back to data for further transmission; wherein the interface device is configured to establish at least two communications links, each link capable of transmitting data at a throughput of at least 1 gigabit per second (Gbps) using just two of the four wire pairs; and at least two transformers coupled to the connector and the interface device for providing power over the two wire pairs of each communications link.

9. The apparatus of claim 8, wherein the apparatus comprises at least four transformers for providing power over the wire pairs.

10. The apparatus of claim 8, further comprising at least one DC power supply connected to the at least two transformers.

11. The apparatus of claim 10, wherein the at least one DC power supply has a supply voltage of at least 48 V.

12. The apparatus of claim 9, further comprising at least two DC power supplies connected to the at least four transformers.

13. A method of transferring data over a network connection utilizing wire pairs, comprising:

transmitting data and encoding the data with a pulse amplitude modulation (PAM) using two transmit encoders;

receiving the encoded data from the two transmit encoders and transmitting the data as a signal across two of the wire pairs using a first set of two hybrid canceller transceivers;

receiving the signal from the first set of two hybrid canceller transceivers using a second set of two hybrid canceller transceivers; and receiving the signal from the second set of two hybrid canceller transceivers and decoding the signal back to data for further transmission using two receive decoders; whereby at least one communications link capable of transmitting data at a rate of at least 1 gigabit per second (Gbps) using just the two of the wire pairs is established.

14. The method of claim 13, wherein the PAM has 5 levels or less.

15. The method of claim 13, wherein the PAM has more than 5 levels.

16. A method of transferring data and providing power over a network connection utilizing wire pairs, comprising:

transmitting data and encoding the data with a pulse amplitude modulation (PAM) using two transmit encoders;

receiving the encoded data from the two transmit encoders and transmitting the data as a signal across two of the wire pairs using a first set of two hybrid canceller transceivers;

receiving the signal from the first set of two hybrid canceller transceivers using a second set of two hybrid canceller transceivers; and receiving the signal from the second set of two hybrid canceller transceivers and decoding the signal back to data for further transmission using two receive decoders; whereby at least one communications link capable of transmitting data at a rate of at least 1 gigabit per second (Gbps) using just the two of the wire pairs is established;

providing a power supply; and coupling the power supply to the at least one communications link via at least two transformers.

17. A method of transferring data and providing power over a network connection utilizing wire pairs, comprising:

transmitting data and encoding the data with a pulse amplitude modulation (PAM) using four transmit encoders;

receiving the encoded data from the four transmit encoders and transmitting the data as a signal across four of the wire pairs using a first set of four hybrid canceller transceivers;

receiving the signal from the first set of four hybrid canceller transceivers using a second set of four hybrid canceller transceivers; and receiving the signal from the second set of four hybrid canceller transceivers and decoding the signal back to data for further transmission using four receive decoders; whereby at least two communications links, each link capable of transmitting data at a rate of at least 1 gigabit per second (Gbps) using just two of the four wire pairs is established;

providing a power supply; and coupling the power supply to at least one of the at least two communications links via at least two transformers.

18. The method of claim 17, further comprising coupling the power supply to the at least two communications links via at least four transformers.

19. A system for network communication, comprising:

at least two devices, each device comprising:

two transmit encoders, the two transmit encoders transmitting data and encoding the data with a pulse amplitude modulation (PAM);

a set of two hybrid canceller transceivers, the set of two hybrid canceller transceivers receiving the encoded data from the two transmit encoders, transmitting the data as a signal across two of the wire pairs and receiving a signal from the set of two hybrid canceller transceivers of the other device; and two receive decoders, the two receive decoders receiving the signal received by the set of two hybrid canceller transceivers and decoding the received signal back to data for further transmission; wherein each device is capable of establishing a communications link capable of transmitting data at a throughput of at least 1 gigabit per second (Gbps) using just the two wire pairs.

20. The system of claim 19, wherein one of the devices further comprises at least two transformers for providing power to at least one other of the devices over the wire pairs.

* * * * *